United States Patent
Park et al.

(10) Patent No.: US 9,774,023 B2
(45) Date of Patent: Sep. 26, 2017

(54) BATTERY MODULE

(71) Applicant: SAMSUNG SDI CO., LTD., Yongin-si, Gyeonggi-do (KR)

(72) Inventors: Shi-Dong Park, Yongin-si (KR); Jong-Han Rhee, Yongin-si (KR); Tae-Yong Kim, Yongin-si (KR); Jun-Woo Cho, Yongin-si (KR); Seong-Joon Park, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 163 days.

(21) Appl. No.: 14/243,600

(22) Filed: Apr. 2, 2014

(65) Prior Publication Data
US 2014/0349164 A1 Nov. 27, 2014

Related U.S. Application Data

(60) Provisional application No. 61/825,724, filed on May 21, 2013.

(51) Int. Cl.
*H01M 2/30* (2006.01)
*H01M 2/20* (2006.01)
*H01M 2/10* (2006.01)

(52) U.S. Cl.
CPC ............ *H01M 2/206* (2013.01); *H01M 2/20* (2013.01); *H01M 2/305* (2013.01); *H01M 2/1077* (2013.01); *H01M 2220/20* (2013.01)

(58) Field of Classification Search
CPC ................................. H01M 2/206; H01M 2/30
See application file for complete search history.

(56) References Cited

U.S. PATENT DOCUMENTS

| 6,365,297 B1* | 4/2002 | Wolczak | H01M 2/1083 429/151 |
|---|---|---|---|
| 2001/0039150 A1 | 11/2001 | Saito et al. | |
| 2010/0167116 A1 | 7/2010 | Okada | |
| 2011/0135968 A1* | 6/2011 | Kim | H01M 2/0215 429/7 |
| 2011/0159350 A1 | 6/2011 | Ochi | |
| 2011/0287299 A1 | 11/2011 | Kim | |
| 2011/0300433 A1* | 12/2011 | Kim | H01M 2/1022 429/159 |

FOREIGN PATENT DOCUMENTS

| EP | 2339663 A1 | 6/2011 |
|---|---|---|
| JP | 2000-333343 A | 11/2000 |
| JP | 2012-181977 | 9/2012 |

OTHER PUBLICATIONS

Search Report dated Feb. 11, 2015 in corresponding European Patent Application No. 14169364.8.
Chinese Office Action dated Jul. 25, 2017.

* cited by examiner

*Primary Examiner* — Olatunji Godo
(74) *Attorney, Agent, or Firm* — Lee & Morse, P.C.

(57) ABSTRACT

A battery module includes a first battery cell, the first battery cell having a first electrode terminal and a second electrode terminal, a first end block adjacent to the first battery cell, the first end block having a first power terminal portion, and a connection portion electrically connecting the first electrode terminal to the first power terminal portion.

17 Claims, 9 Drawing Sheets

BATTERY MODULE

CROSS-REFERENCE TO RELATED APPLICATION

This application claims priority to U.S. Provisional Application No. 61/825,724, filed in the U.S. Patent and Trademark Office on May 21, 2013, and entitled "BATTERY MODULE," which is hereby incorporated by reference herein in its entirety.

BACKGROUND

1. Field

Embodiments relate to a battery module.

2. Description of the Related Art

In general, battery cells are used as energy sources for mobile devices, electric vehicles, hybrid vehicles, and the like. Various shapes of the battery cell may be used depending on the application to which the battery cell is applied.

A compact mobile device such as a cellular phone may be operated with the power and capacity of a single battery cell for a predetermined time. However, in a case where long-time driving and high-power driving are required, e.g., in an electric vehicle or hybrid vehicle which consumes a large amount of power, a large-capacity battery module may be configured by electrically connecting a plurality of battery cells in order to increase power and capacity. The output voltage or output current of the battery module may be increased according to the number of battery cells built in the battery module. In addition, a battery pack may be configured by electrically connecting such battery modules.

SUMMARY

Embodiments are directed to a battery module, including a first battery cell, the first battery cell having a first electrode terminal and a second electrode terminal, a first end block adjacent to the first battery cell, the first end block having a first power terminal portion, and a connection portion electrically connecting the first electrode terminal to the first power terminal portion.

The first end block may include an outer portion and a power terminal, the outer portion being adjacent to the first battery cell and being electrically isolated from the first battery cell, the power terminal being electrically connected to the first electrode terminal.

The first end block may be formed of an insulating material, and the first power terminal portion may include an electrically conductive power terminal embedded in the insulating material.

The first end block may contact a side surface of the first battery cell.

The battery module may further include a second battery cell, the second battery cell having a first electrode terminal and a second electrode terminal. The first electrode terminal of the second battery cell may be electrically connected to the second electrode terminal of the first battery cell, and the first and second battery cells may be interposed between the first end block and a second end block.

The second end block may include a second power terminal portion coupled to an electrode terminal of a battery cell of the battery module, the second power terminal portion having an opposite polarity to the first power terminal portion.

The battery module may further include an end plate at each end of the battery module, the end plates being configured to press the first and second end blocks towards one another with the battery cells therebetween.

At least one of the end plates may include at least one protruding region that protrudes toward the corresponding end block and is accommodated by a recess in the corresponding end block.

The connection portion may include a first connection region, a second connection region, and an extending portion that couples the first connection region to the second connection region.

The first connection region may be coupled to the first electrode terminal.

The first connection region may contact the first electrode terminal.

The battery module may further include a second battery cell, the second battery cell having a first electrode terminal and a second electrode terminal. The first electrode terminal of the second battery cell may be electrically connected to the second electrode terminal of the first battery cell by a bus-bar, and the first electrode terminal of the first battery cell may have an outermost bus-bar thereon, the first connection region being electrically connected to the first electrode terminal of the first battery cell via the outermost bus-bar.

The first power terminal portion may include an insertion hole and a power terminal, the insertion hole being formed in an upper surface of the first end block, the power terminal being inserted into the insertion hole and having a terminal hole.

The insertion hole may be formed inclined toward a side surface of the first end block from the upper surface of the first end block.

The second connection region may have a through-hole corresponding to the first power terminal portion.

The second connection region may be in direct contact with the power terminal.

The connection portion may be a monolithic piece of metal.

The first end block may have a projection portion proximate to the first power terminal portion, the projection portion being configured to align the connection portion with the first power terminal portion.

The connection portion may abut the projection portion.

The connection portion may have a through-hole, and the projection portion is inserted into the through-hole.

BRIEF DESCRIPTION OF THE DRAWINGS

Features will become apparent to those of skill in the art by describing in detail example embodiments with reference to the attached drawings in which.

DETAILED DESCRIPTION

Figure 1:
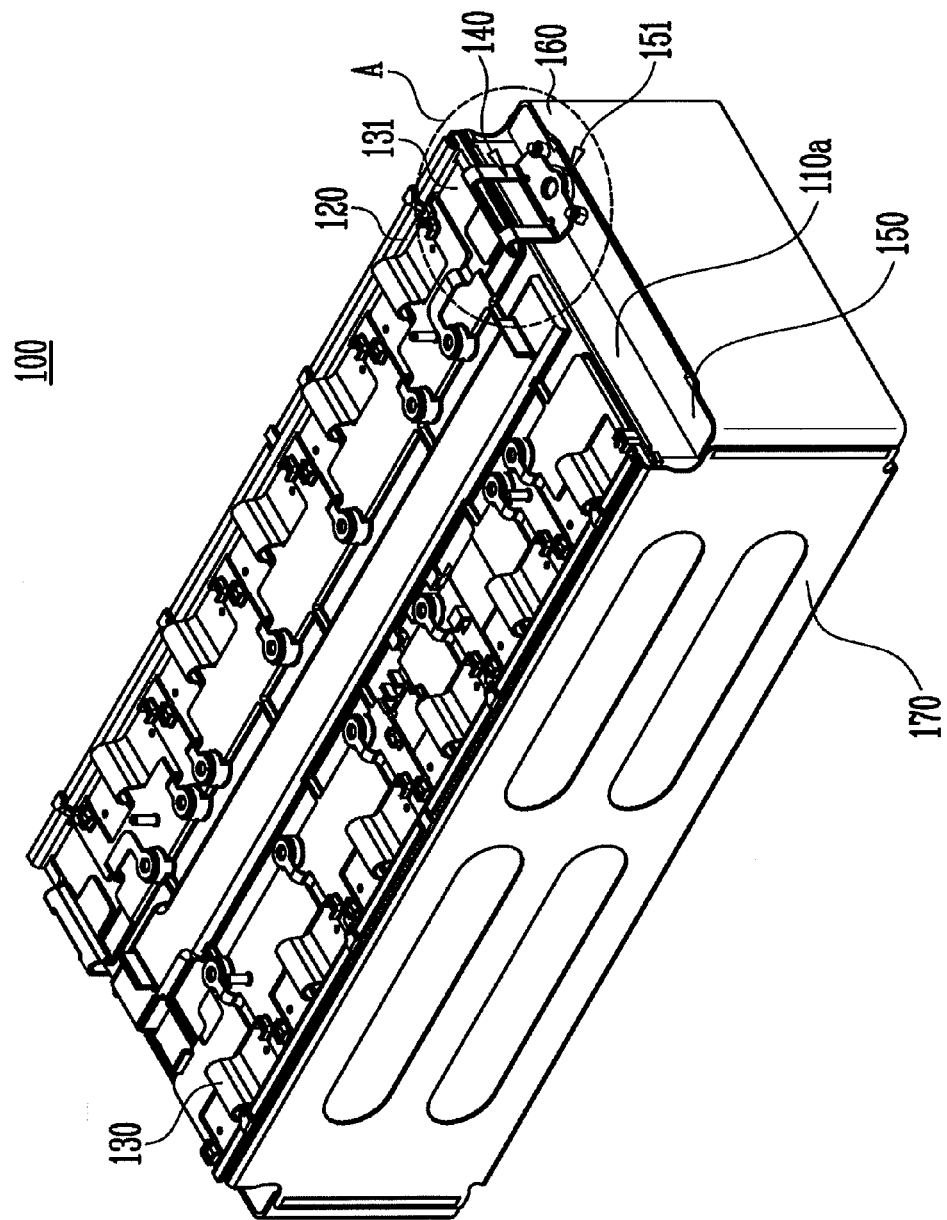
FIG. 1 is a perspective view of a battery module according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it may be the only element between the two elements, or one or more intervening elements may also be present. Like reference numerals refer to like elements throughout.

When an element is referred to as being "on" another element, it may be directly on the other element or be indirectly on the other element with one or more intervening elements interposed therebetween. Also, when an element is referred to as being "connected to" another element, it may be directly connected to the other element or be indirectly connected to the other element with one or more intervening elements interposed therebetween.

Figure 2:
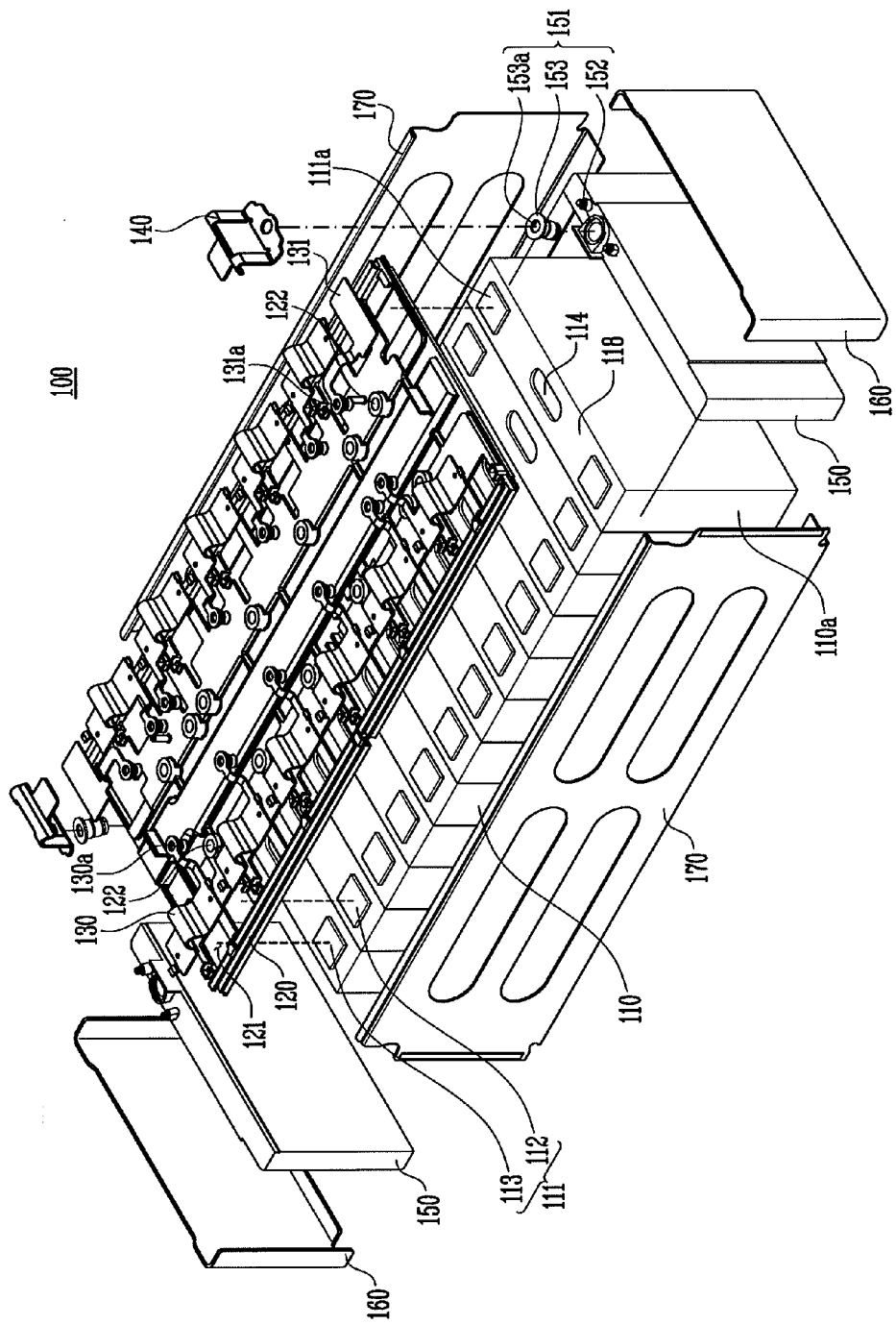
FIG. 2 is an exploded perspective view of FIG. 1.

FIG. 1 is a perspective view of a battery module according to an example embodiment. FIG. 2 is an exploded perspective view of FIG. 1.

In the example embodiment shown in FIGS. 1 and 2, a battery module 100 includes a plurality of battery cells 110 aligned in one direction, and each including a terminal portion 111 formed on one surface thereof; end blocks 150 respectively disposed at outermost sides of the plurality of the battery cells 110, and each having a power terminal portion 151 formed on one surface thereof; and a connection portion electrically connecting a terminal portion 111a of the battery cell 110a disposed at the outermost side of the battery cells 110 to the power terminal portion 151.

The battery cell 110 may include a battery case having one opened surface, and an electrode assembly and an electrolyte accommodated in the battery case. The electrode assembly and the electrolyte generate energy through an electrochemical reaction therebetween. The battery case may be sealed by a first surface 118. For example, the first surface 118 of the battery cell 110 may include a cap assembly. The first surface 118 may be provided with positive and negative electrode terminals 112 and 113 having different polarities, and a vent portion 114. The vent portion 114 is a safety means of the battery cell 110 and acts as a passage through which gas generated inside the battery cell 110 is exhausted to the outside of the battery cell 110.

According to the present example embodiment, two end plates 160 are respectively disposed on outer surfaces of the end blocks 150, and two side plates 170 are respectively disposed at side surfaces of plurality of the battery cells 110. The plurality of battery cells 110 may be aligned in the one direction in the space defined by the pair of end plates 160 and the pair of side plates 170, e.g., the plurality of battery cells 110 may be aligned in parallel to one another so that their wide front surfaces are opposite to each other.

The positive and negative electrode terminals 112 and 113 of two neighboring battery cells 110 may be electrically connected to each other by a bus-bar 130. A bus-bar holder 120 may be disposed on upper portions of the battery cells 110. According to the present example embodiment, the bus-bar holder 120 has openings 121 through which the respective terminal portions 111 are exposed. The bus-bar 130 is disposed on the opening 121 for the purpose of connection between the terminal portions 111. The bus-bar 130 may be fastened to the bus-bar holder 120 through a bolt (not shown) inserted into a first fastening hole 122 formed in the bus-bar holder 120 and a second fastening hole 130a formed in the bus-bar 130.

According to the present example embodiment, an outermost bus-bar 131 is connected to the terminal portion 111a, to which the bus-bar 130 is not connected, of the terminal portions 111a of the battery cells 110a respectively disposed at the outermost sides of the battery cells 110. The outermost bus-bar 131 is not connected to the terminal portions 111 of the neighboring battery cells 110, but is electrically connected to the terminal portion 111a and the connection portion 140. The outermost bus-bar 131 may be fastened to the bus-bar holder 120 through a bolt (not shown) inserted into a third fastening hole 131a formed in the outermost bus-bar 131 and the first fastening hole 122 formed in the bus-bar holder 120.

Various shapes of the bus-bar 130 and the outermost bus-bar 131, etc., may be implemented according to the design of the positive and negative electrode terminals 112 and 113.

Figure 3:
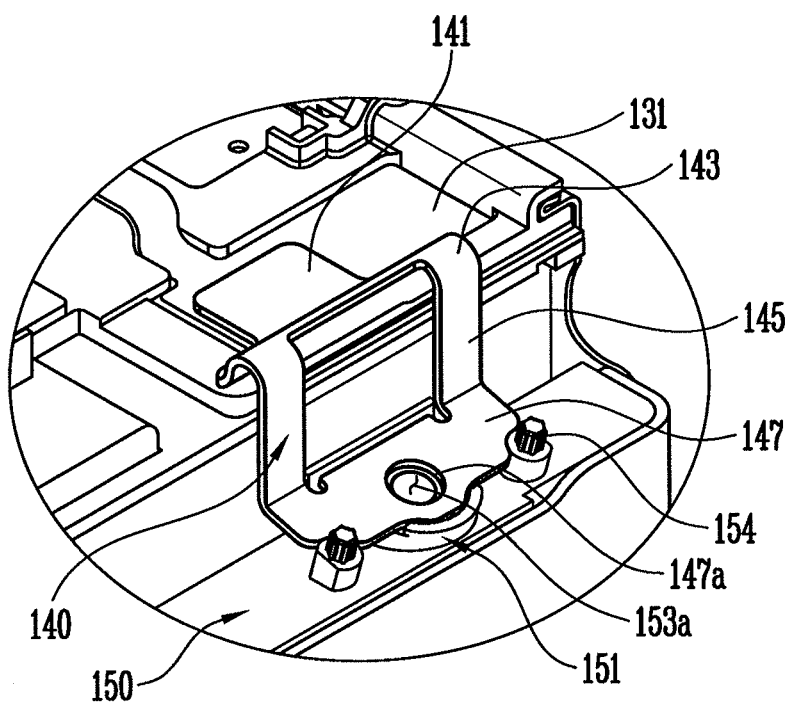
FIG. 3 is an enlarged perspective view of area 'A' of FIG. 1, for illustrating a connection relationship between an end block and a connection portion.
Figure 4:
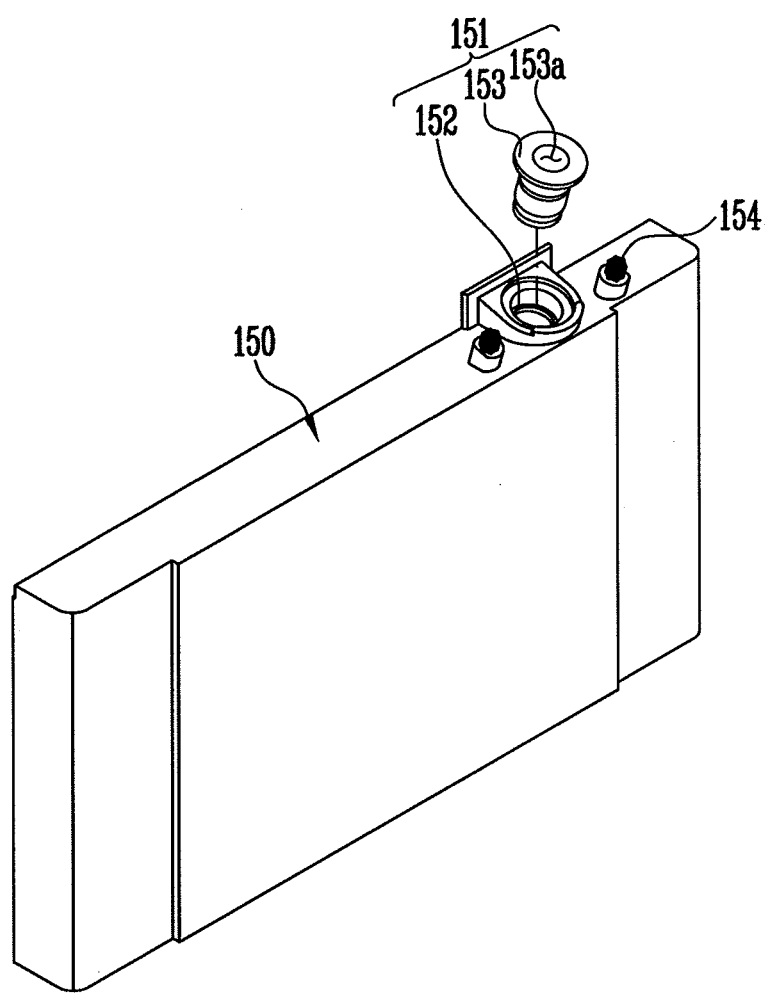
FIG. 4 is a perspective view illustrating an end block according to an example embodiment.
Figure 5A:
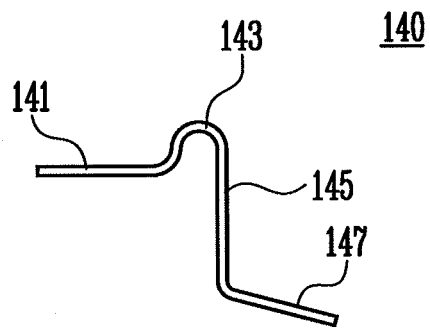
FIGS. 5A and 5B are side and perspective views illustrating a connection portion according to an example embodiment.
Figure 5B:
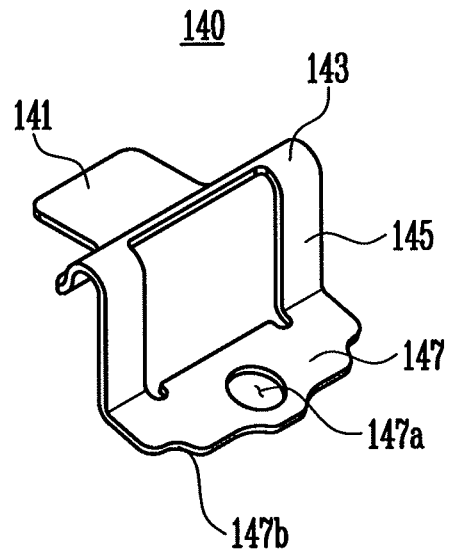

FIG. 3 is an enlarged perspective view of area 'A' of FIG. 1, for illustrating a connection relationship between the end block and the connection portion. FIG. 4 is a perspective view illustrating an end block according to an example embodiment. FIGS. 5A and 5B are side and perspective views illustrating a connection portion according to an example embodiment.

In the example embodiments shown in FIGS. 3 to 5, the power terminal portion 151 is formed on one surface of the end block 150. The power terminal portion 151 provides the battery module 100 with a power terminal 153 electrically connected to the terminal portion 111a of the battery cell 110a disposed at the outermost side of the battery cell 110, so that the battery module 100 may be connected to, e.g., another battery module through a power cable connected to the power terminal 153.

For example, the power terminal portion 151 may include an insertion hole 152 formed on the one surface of the end block 150, the power terminal 153 inserted into the insertion hole 152, and a terminal hole 153a in the power terminal 153.

The insertion hole 152 may be formed inclined toward a side surface of the end block 150 from the upper surface of the end block 150 in order to expand a space in which the power terminal 153 is to be inserted into the end block 150. The power terminal 153 may be an insert nut, and the end block 150 may be injection-molded by inserting the insert nut into the insertion hole 152.

The connection portion 140 may include a first connection region 141 electrically connected to the terminal portion 111a of the battery cell 110a disposed at the outermost side of the battery cells 110; an extending region 145 bent at a bending portion 143 from the first connection region 141 and extended toward the power terminal portion 151; and a second connection region 147 extended from the extending region 145, and having a through-hole 147a formed therein. The through-hole 147a corresponds to the terminal hole 153a of the power terminal 153.

The first connection region 141 may be connected to the outermost bus-bar 131 connected to the terminal portion 111a of the battery cell 110a disposed at the outermost side of the battery cells 110, so as to be electrically connected to the terminal portion 111a through the outermost bus-bar 131. Various arrangements may be made for electrically connecting the first connection region 141 to the terminal portion 111a according to the shapes of the terminal portion 111a and the outermost bus-bar 131. For example, in another example embodiment, the first connection region 141 may be formed to extend from the outermost bus-bar 131 connected to the terminal portion 111a of the battery cell 110a disposed at the outermost side of the battery cells 110.

According to the present example embodiment, at least one projection portion 154 is formed near the power terminal 153 on the upper surface of the end block 150. In the second connection region 147, a guide portion 147b guided by the projection portion 154 may be formed. The position of the second connection region 147 is guided by latching the guide portion 147b to the projection portion 154. Accordingly, the terminal hole 153a of the power terminal 153 and the through-hole 147a of the second connection region 147 may be disposed to correspond to each other.

According to an example embodiment, the end block 150 may be formed of an insulating material, and the connection portion 140 and the power terminal 153 may be formed of an electrical conductive metal such as gold, silver, copper, nickel, aluminum, copper alloy, or aluminum alloy.

According to the present example embodiment, the battery module 100 includes the end block 150 having the power terminal 153, and the power terminal 153 of the battery module 100 may be connected to a power terminal 153 formed in another battery module. The connection between the power terminals 153 may be performed through a power cable, a separate bus-bar, or the like According to the present example embodiment, the end blocks 150 are disposed to come in surface contact with the respective battery cells 110a disposed at the outermost sides of the battery cells 110. The end blocks 150 may apply pressure to the inside of the battery cells 110 to help prevent a swelling phenomenon occurring in the battery cell 110. In a general battery module, the outermost battery cells may be pressed using only end plates, and with thin end plates there are limits to strongly pressing the battery cells. According to the present example embodiment, the end blocks 150 are further provided, so that the thickness of a portion pressing the battery cell 110a is increased, and thus it may be possible to more strongly press the battery cell 110a.

Figure 6:
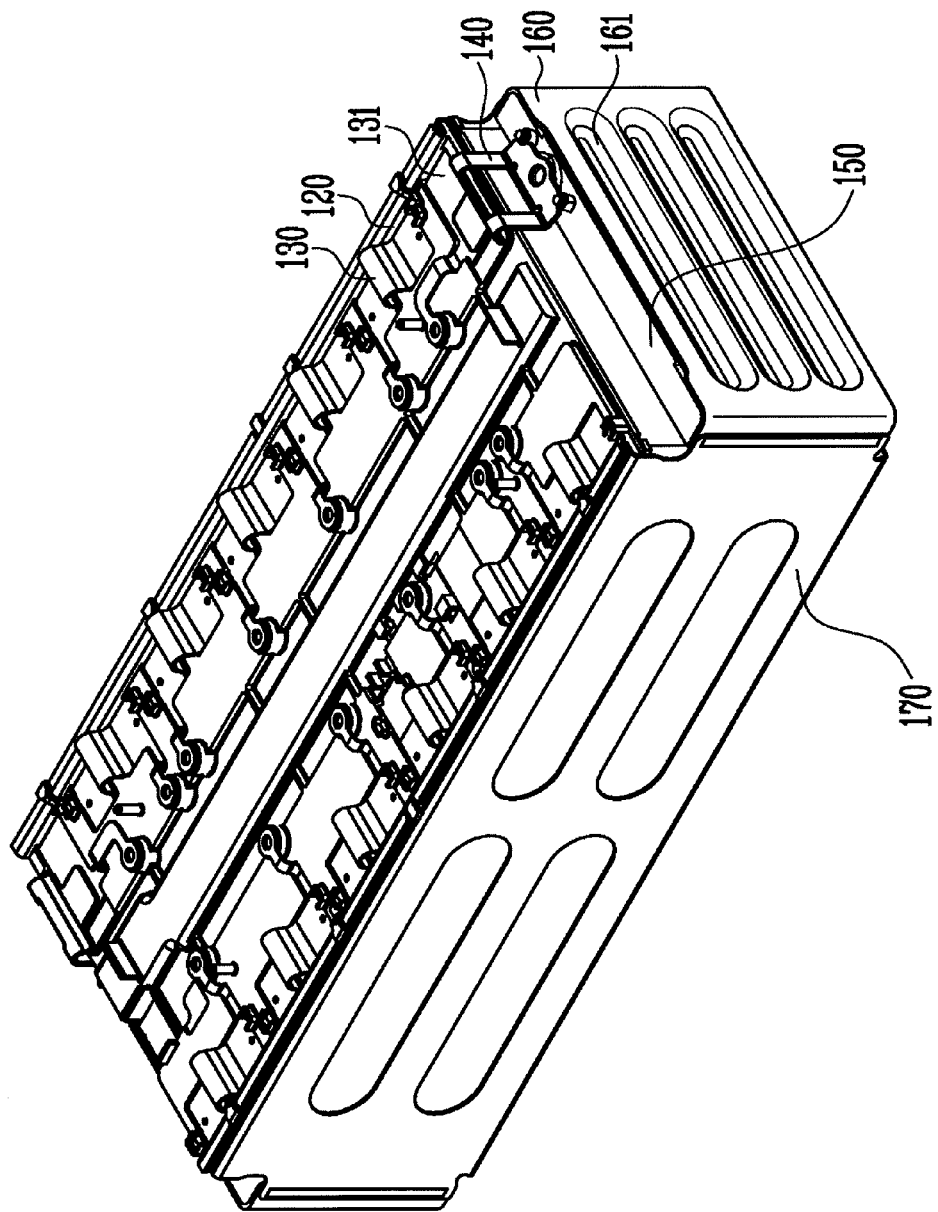
FIG. 6 is a perspective view of a battery module according to an example embodiment.
Figure 7:
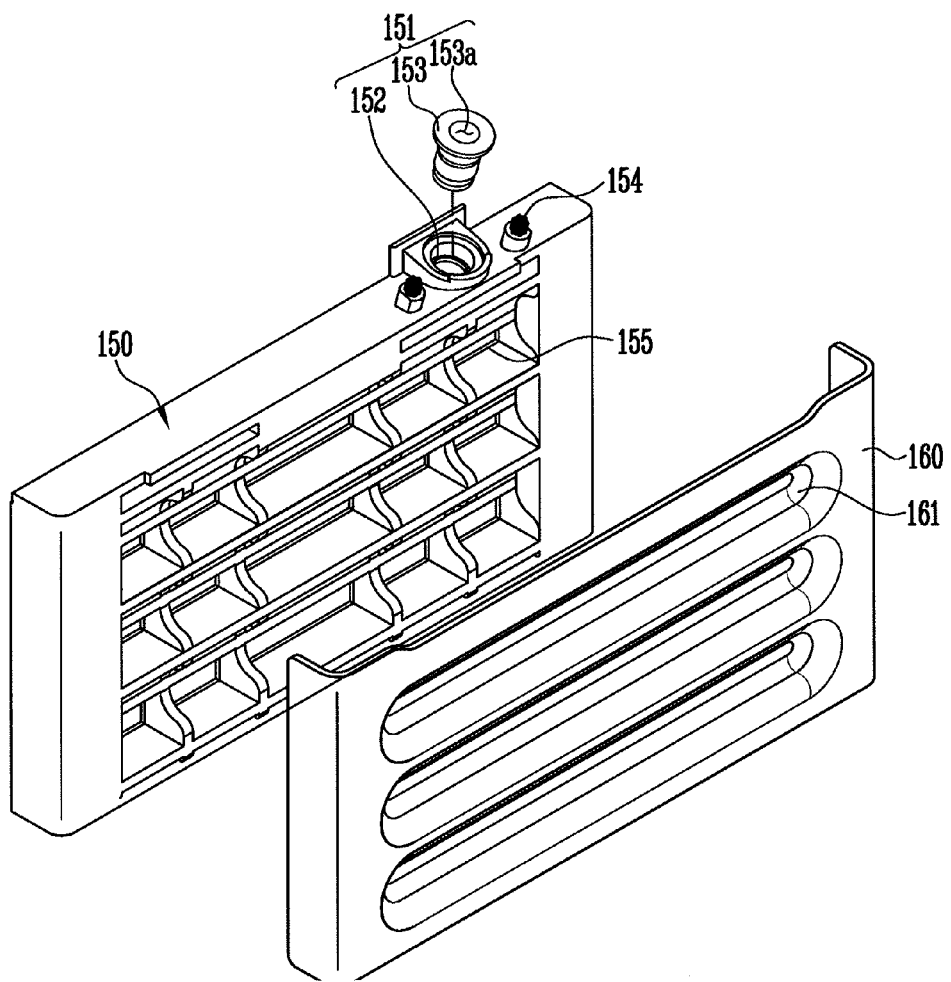
FIG. 7 is a perspective view illustrating an end block and an end plate of FIG. 6.

FIG. 6 is a perspective view of a battery module according to an example embodiment. FIG. 7 is a perspective view illustrating an end block and an end plate, shown in FIG. 6.

Hereinafter, the end block and the end plate according to the present example embodiment will be described with reference to FIGS. 6 and 7. Here, components identical or corresponding to those of the above-described embodiments are designated by like reference numerals, and details thereof may be omitted to avoid redundancy.

Referring to FIGS. 6 and 7, at least one protruding region 161 protruded toward the end block 150 is formed at a side of the end plate 160. At least one accommodating region 155 accommodating the protruding region 161 therein is formed at a side of the end block 150. The protruding region 161 is accommodated in the accommodating region 155, so that the end block 150 and the end plate 160 may be coupled closely to each other, which may help increase strength of the end plate 160 against bending.

Figure 8:
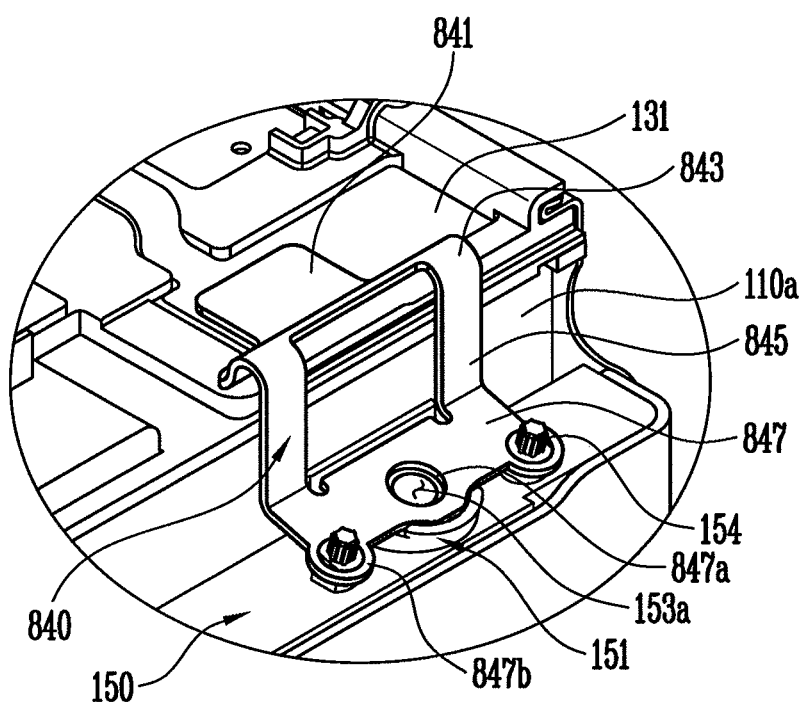
FIG. 8 is an enlarged perspective view illustrating a connection relationship between a connection portion and a power terminal portion according to an example embodiment.

FIG. 8 is an enlarged perspective view illustrating a connection relationship between a connection portion and a power terminal portion according to an example embodiment.

Hereinafter, the connection portion according to the present example embodiment will be described with reference to FIG. 8. Here, components identical or corresponding to those of the above-described embodiments are designated by like reference numerals, and details thereof may be omitted to avoid redundancy.

Referring to FIG. 8, the connection portion 840 may include a first connection region 841 electrically connected to the outermost bus-bar 131; an extending region 845 bent at a bending portion 843 from the first connection region 841 and extended toward the power terminal portion 151; and a second connection region 847 extended from the extending region 845, and having a through-hole 847a formed therein. The through-hole 847a corresponds to the terminal hole 153a of the power terminal portion 151.

According to the present example embodiment, a guide hole 847b, into which the projection portion 154 formed on the upper surface of the end block 150 is inserted so that the position of the second connection region 847 is guided by the guide hole 847b, is formed in the second connection region 847.

According to the present example embodiment, in the connection portion 840, the position of the second connection region 847 is guided by inserting the projection portion 154 into the guide hole 847b. Accordingly, the terminal hole 153a of the power terminal and the through-hole 847a of the second connection region 847 may be disposed to correspond to each other.

A fastening member (not shown) such as a nut may be fastened to the projection portion 154 inserted into the guide hole 847b, so that the connection portion 840 and the power terminal portion 151 may be strongly coupled to each other.

Figure 9:
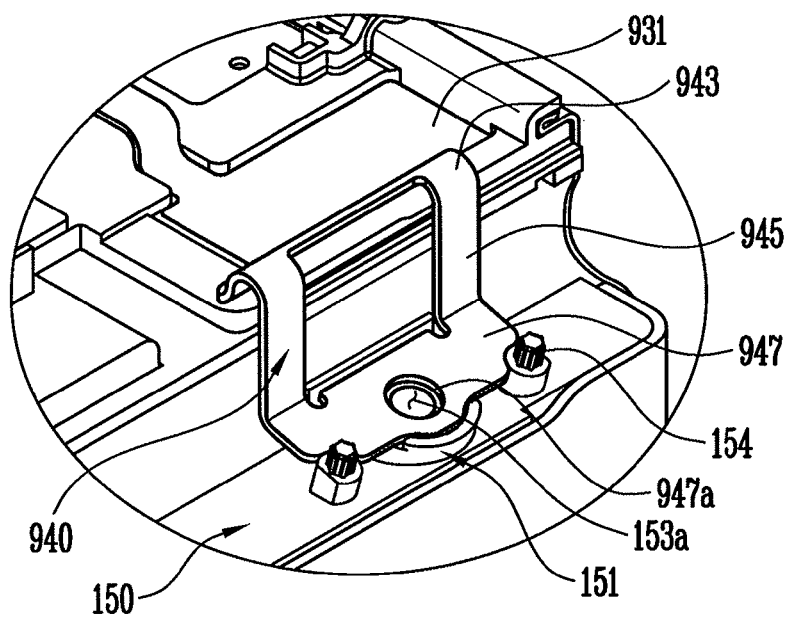
FIG. 9 is a perspective view illustrating a connection portion according to an example embodiment.
Figure 10:
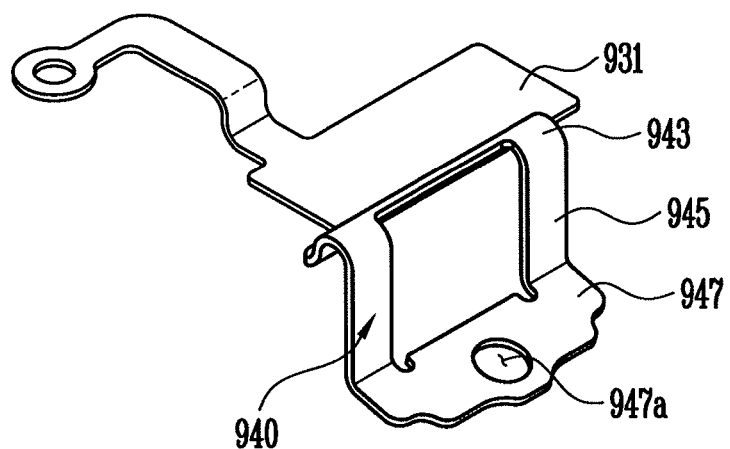
FIG. 10 is a perspective view illustrating a connection relationship between the connection portion of FIG. 9 and the power terminal portion.

FIG. 9 is a perspective view illustrating a connection portion according to an example embodiment. FIG. 10 is a perspective view illustrating a connection relationship between the connection portion of FIG. 9 and the power terminal portion.

Hereinafter, the connection portion according to the present example embodiment will be described with reference to FIGS. 9 and 10. Here, components identical or corresponding to those of the above-described embodiments are designated by like reference numerals, and details thereof may be omitted to avoid redundancy.

Referring to FIGS. 9 and 10, the connection portion 940 may include an outermost bus-bar 931 connected to the terminal portion 111a of the battery cell 110a disposed at the outermost side of the battery cells 110; an extending region 945 bent at a bending portion 943 from the outermost bus-bar 931 and extended toward the power terminal portion 151; and a second connection region 947 extended from the extending region 945, and having a through-hole 947a formed therein. The through-hole 947a corresponds to the terminal hole 153a of the power terminal 153.

As compared to the embodiment shown in FIG. 2, according to the present example embodiment the connection portion 940 is integrally formed with the outermost bus-bar 931, so that the power terminal portion 151 and the terminal portion 111a connected to the outermost bus-bar 931 may be electrically connected to each other through the connection portion 940. Various shapes of the outermost bus-bar 931 may be implemented according to the design of the positive and negative electrode terminals 112 and 113.

As described above, embodiments may provide a battery module including a power terminal for connecting battery modules to each other. In a battery module according to an embodiment, end blocks each having a power terminal portion are respectively disposed at outermost sides of a plurality of battery cells, so that the battery module may be connected to, e.g., another battery module. Further, the end blocks may strongly press the plurality of battery cells, which may help prevent a swelling phenomenon of the battery cell.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a first battery cell, the first battery cell having a first electrode terminal and a second electrode terminal;
   a second battery cell adjacent to the first battery cell, the second battery cell having a first electrode terminal and a second electrode terminal, the second battery cell being electrically connected to the first battery cell by a first bus-bar connected to the second electrode terminal of the first battery cell;
   a first end block adjacent to the first battery cell, the first end block having a first power terminal portion; and
   a connection portion electrically connecting the first electrode terminal to the first power terminal portion, the connection portion consisting of a monolithic piece of metal, one end of the connection portion contacting an outermost bus-bar of the first electrode terminal.

2. The battery module as claimed in claim 1, wherein the first end block includes an outer portion and a power terminal, the outer portion being adjacent to the first battery cell and being electrically isolated from the first battery cell, the power terminal being electrically connected to the first electrode terminal by the connection portion.

3. The battery module as claimed in claim 1, wherein the first end block is formed of an insulating material, and the first power terminal portion includes an electrically conductive power terminal embedded in the insulating material.

4. The battery module as claimed in claim 1, wherein the first end block contacts a side surface of the first battery cell.

5. The battery module as claimed in claim 1, wherein: the first electrode terminal of the second battery cell is electrically connected to the second electrode terminal of the first battery cell by the first bus-bar, and the first and second battery cells are interposed between the first end block and a second end block.

6. The battery module as claimed in claim 5, wherein the second end block includes a second power terminal portion coupled to an electrode terminal of a battery cell of the battery module, the second power terminal portion having an opposite polarity to the first power terminal portion.

7. The battery module as claimed in claim 5, further comprising an end plate at each end of the battery module, the end plates being configured to press the first and second end blocks towards one another with the battery cells therebetween.

8. The battery module as claimed in claim 7, wherein at least one of the end plates includes at least one protruding region that protrudes toward the corresponding end block and is accommodated by a recess in the corresponding end block.

9. The battery module as claimed in claim 1, wherein the connection portion includes a first connection region, a second connection region, and an extending portion that couples the first connection region to the second connection region.

10. The battery module as claimed in claim 9, wherein the first connection region is coupled to the first electrode terminal via the outermost bus-bar.

11. The battery module as claimed in claim 9, wherein the first power terminal portion includes an insertion hole and a power terminal, the insertion hole being formed in an upper surface of the first end block, the power terminal being inserted into the insertion hole and having a terminal hole.

12. The battery module as claimed in claim 11, wherein the insertion hole is formed inclined toward a side surface of the first end block from the upper surface of the first end block.

13. The battery module as claimed in claim 11, wherein the second connection region has a through-hole corresponding to the first power terminal portion.

14. The battery module as claimed in claim 11, wherein the second connection region is in direct contact with the power terminal.

15. The battery module as claimed in claim 1, wherein the first end block has a projection portion proximate to the first power terminal portion, the projection portion being configured to align the connection portion with the first power terminal portion.

16. The battery module as claimed in claim 15, wherein the connection portion abuts the projection portion.

17. The battery module as claimed in claim 15, wherein the connection portion has a through-hole, and the projection portion is inserted into the through-hole.

* * * * *